United States Patent Office

3,144,475
Patented Aug. 11, 1964

3,144,475
BENZYL DIALKYLTHIOLCARBAMATES
Marion W. Harman, Dunbar, and John J. D'Amico, Charleston, W. Va., assignors to Monsanto Company, a corporation of Delaware
No Drawing. Filed July 3, 1961, Ser. No. 121,370
9 Claims. (Cl. 260—455)

This invention relates to benzyl dialkylthiolcarbamates having the property of destroying undesired vegetation and particularly the property of destroying wild oats at low, economic levels of toxicant. The wild oat (*Avena fatua*) presents a weed problem which has plagued farmers throughout large sections of the world for generations.

It has been found that benzyl diisopropylthiolcarbamate destroys wild oat seedlings at low concentrations with little or no injury to crops. Benzyl dialkylthiolcarbamates in which the alkyl groups contain 2–4 carbon atoms inclusive are useful although 3 carbon alkyl groups are preferred. Certain halogenated benzyl esters retain high toxicity to wild oats but exert less specificity.

Benzyl esters may be prepared by condensing benzyl halide or substituted benzyl halide with a salt of a thiocarbamic acid. Randomly chlorinated benzyl halides yield toxic products and are more economical than pure isomers. Thus, ar,ar,ar-trichlorobenzyl chloride may be prepared by the following procedure: Substantially 1500 parts by weight of dry toluene was charged into a chlorinator of suitable capacity. Substantially 15 parts by weight of iron filings were added as catalyst carrier for ring chlorination and chlorine introduced at about 20° C. During the last part of the run the temperature was increased to about 70° C. in order to keep the mixture fluid and the flow of chlorine continued until the increase in weight corresponded to that calculated for trichlorotoluene. Thus, when the product analyzed 54.8% chlorine, the flow of chlorine was interrupted and the trichlorotoluene given a 10% caustic wash and filtered through a bed of clay in order to remove the iron. Alternatively, the iron may be removed by distillation of the chlorinated product. The product was then chlorinated at 160° C. in the presence of ultra violet light until the gain in weight was that calculated for trichlorobenzyl chloride. Analysis of the product for chlorine at this point gave 61.8%.

ar,ar,ar-Trichlorobenzyl dipropylthiolcarbamate was prepared as follows: A solution comprising 202.4 grams (2.0 moles) of di-n-propylamine and 500 ml. of dry ethyl ether was cooled to $-10°$ C. and 120 grams (2.0 moles) of carbonoxysulfide bubbled in at $-10$ to 0° C. over a 30 minute period or until a gain in weight of 120 grams. The reaction mixture was stirred at 0–10° C. for 1.5 hours and then 230 grams (1.0 mole) of ar,ar,ar-trichlorobenzyl chloride added in one portion. The mixture was maintained at 25–30° C. for 24 hours, filtered to remove the amine hydrochloride and the ether removed in vacuo. Unreacted ar,ar,ar-trichlorobenzyl chloride was removed by heating at 1–2 mm. at a maximum temperature of 150–200° C. and the product filtered to remove a small amount of impurities. A dark amber viscous oil was obtained in 82.7% theory yield. Analysis gave 3.23% nitrogen and 9.57% sulfur as compared to 3.95% nitrogen and 9.04% sulfur calculated for $C_{14}H_{18}Cl_3NOS$.

Substituting diisopropylamine in the foregoing procedure yielded ar,ar,ar-trichlorobenzyl diisopropylthiolcarbamate as a viscous amber oil.

α-2,3,4-tetrachlorotoluene was prepared by light catalyzed chlorination of 2,3,4-trichlorotoluene. 283 grams of trichlorotoluene was heated to 180° C. and then with a sunlamp placed 8 to 10 inches from the pot, 50 grams of chlorine added over 40 minutes at 180 to 200° C. The product was distilled in vacuo to yield α-2,3,4-tetrachlorotoluene as a colorless liquid, B.P. 137–142° C. at 10 mm. Hg.

α-2,5-trichlorotoluene was prepared by light catalyzed chlorination of 2,5-dichlorotoluene in a manner similar to that described. The desired product was isolated by fractional distillation as a colorless liquid, B.P. 132–136° C. at 25 mm. Hg. Condensation of α-2,5-trichlorotoluene with sodium diisopropylthiolcarbamate yielded 2,5-dichlorobenzyl diisopropylthiolcarbamate in 66% yield as an amber oil.

To a stirred solution comprising 42 grams (0.324 mole) of dibutylamine, 40 grams (0.25 mole) of 25% sodium hydroxide and 50 grams of water was added at 0–8° C. in 30 minutes 19 grams (0.27 mole) of 85% carbonoxysulfide. There was then added in one portion 31.6 grams (0.25 mole) of benzyl chloride and the mixture maintained for one hour each at 0–10° C.; at 10–15° C.; at 15–20° C.; at 20–25° C. and finally for 20 hours at 25–30° C. Thereupon 200 ml. of water and 400 ml. of ethyl ether were added, the ether layer separated, washed with water until neutral to litmus and dried over sodium sulfate. The ether was removed in vacuo and the residue stripped finally at 140–150° C./1–2 mm. Benzyl dibutylthiolcarbamate was obtained in 97% yield as an amber oil. Analysis gave 5.1% nitrogen and 11.56% sulfur compared to 5.01% nitrogen and 11.48% sulfur calculated for $C_{16}H_{25}NOS$.

To a stirred solution comprising 11 grams (0.1 mole) of 88% diisopropylamine, 16 grams (0.1 mole) of 25% sodium hydroxide and 20 ml. of water was added at 5–10° C. over a period of 12 minutes 7.8 grams (0.11 mole) of 85% carbonoxysulfide. Next there was added in one portion 23 grams (0.1 mole) of 2,3,6-trichlorobenzyl chloride and the reaction mixture stirred at 25–30° C. for 5 hours. Thereupon 500 ml. of water were added and the mixture stirred and cooled to 5° C. The precipitate was collected by filtration, washed with water until neutral to litmus and air-dried at 25–30° C. 2,3,6-Trichlorobenzyl diisopropylthiolcarbamate was obtained in 95.5% yield as a white solid. It melted at 90–92° C. after recrystallization from heptane. Analysis gave 3.75% nitrogen and 8.79% sulfur compared to 3.95% nitrogen and 9.04% sulfur calculated for $C_{14}H_{18}Cl_3NOS$.

To a stirred solution of 133 grams (1.3 moles) of diisopropylamine, 200 ml. of water and 160 grams (1.0 mole) of 25% sodium hydroxide was added at 0–10° C. over a period of 80 minutes 76 grams (1.08 moles) of 85% carbonoxysulfide. There was then added in one portion 126.6 grams (1.0 mole) of benzyl chloride and the reaction mixture stirred for intervals of one hour each at 0.10° C., at 10–15° C., at 15–20° C., at 20–25° C. and at 25–30° C. To the reaction mixture was then added 250 ml. of water and the solution stirred for an additional 10 minutes. The top organic layer was separated and heated in vacuo at a maximum temperature of 80–90° C./1–2 mm. A 68.5% yield of benzyl diisopropylthiolcarbamate was obtained analyzing 5.02% nitrogen and 12.79% sulfur compared to 5.57% nitrogen and 12.76% sulfur calculated for $C_{14}H_{21}NOS$. After further heating at a pot temperature of 170° C. at 1–2 mm. Hg analysis of the residue gave 5.42% nitrogen and 13.02% sulfur.

To a stirred charge comprising 28 grams (0.25 mole) of 88% diisopropylamine, 40 grams (0.25 mole) of 25% sodium hydroxide and 50 ml. of water was added at 5–10° C. over a period of one-half hour 19.5 grams (0.275 mole) of 85% carbonoxysulfide. Next there was added in one portion 38.2 grams (0.2 mole) of 5-chloro-2-methoxybenzyl chloride and the reaction mixture stirred at 25–30° C. for 5 hours. The product was extracted with 400 ml. of ethyl ether and filtered to remove by-product salt. The ether solution was washed with water until neutral to litmus, dried over sodium sulfate and the ether removed in vacuo at a maximum temperature of 80–90° C./1–2 mm. 5-chloro-2-methoxybenzyl diisopropylthiolcarbamate was obtained in 74.5% yield as a light amber oil. Analysis gave 9.52% sulfur compared to 10.15% calculated for $C_{15}H_{22}ClNO_2S$.

Employing the procedure of the above example, diisopropylamine and the appropriate benzyl chloride, the following were prepared:

2,6-dichlorobenzyl diisopropylthiolcarbamate in 78% yield as a semi-solid. Upon drying on a porous plate, a white solid was obtained melting at 101–103° C. Analysis gave 4.34% nitrogen and 10.19% sulfur compared to 4.37% nitrogen and 10.01% sulfur calculated for $C_{14}H_{19}Cl_2NOS$.

m-Chlorobenzyl diisopropylthiolcarbamate in 75.9% yield as an amber oil analyzing 11.24% sulfur compared to 11.22% calculated for $C_{14}H_{20}ClNOS$.

A 12.7% aqueous solution of sodium diethylthiolcarbamate was prepared by mixing 146.3 grams (2.0 moles) of diethylamine, 320 grams (2.0 moles) of 25% sodium hydroxide and 2000 ml. of water. To this solution, with stirring at 0° C., there was bubbled in carbonoxysulfide until the gain in weight was 146 grams. The solution was stirred for an additional 2 hours at 0–5° C.

To 412.5 grams (0.33 mole) of the sodium diethylthiolcarbamate so prepared there was added in one portion with stirring 57.5 grams (0.25 mole) of ar,ar,ar-trichlorobenzyl chloride. The stirred reaction mixture was heated at 50–60° C. for 3 hours and then maintained at 25–30° C. for 12 hours. The product was extracted with 300 ml. of ethyl ether, the ether solution washed with water until neutral to litmus, and dried over sodium sulfate. The ether was removed in vacuo at a maximum temperature of 80–90° C./1–2 mm. The ar,ar,ar-trichlorobenzyl diethylthiolcarbamate was obtained as a yellow liquid in 71% yield. Analysis gave 3.71% nitrogen compared to 4.29% calculated for $C_{12}H_{14}Cl_3NOS$.

The next toxicants may be applied conveniently in the form of a spray containing the active ingredient in a concentration within the range of 0.1–10.0% by weight. As pre-emergence herbicides they control wild oats within the range of ¼ to 5 pounds per acre or even lower dosages. Although the esters are insoluble in water they are soluble in common organic solvents. The esters may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecylbenzenesulfonate, an amine salt as for example dibutylammonium dodecylbenzenesulfonate, alkali metal salts of sulfated fatty alcohols, ethylene oxide condensation products of alkyl phenols, or tall oil or higher mercaptans and other dispersing and wetting agents. Formulation of dry compositions is accomplished by mixing with finely divided solid carriers. Suitable carriers comprise talc, clay, pyrophyllite, silica and fuller's earth. Usually the toxicant will be only a minor proportion. The dry formulation may be used as a dust or dispersed in aqueous medium before application. If the latter it is convenient to incorporate a wetting or dispersing aid into the formulation.

As illustrative of the toxicity to wild oats the ester was dissolved in a relatively high volume of volatile organic solvent and applied as a spray to the soil surface of pans seeded with a counted number of wild oat seeds. About 14 days after application of the toxicants results were observed and recorded. The number of seeds emerging was converted to weighted herbicidal ratings based on average percent germination of any particular seed lot times an injury factor. This evened irregularities of ratings on seeds which varied in percent germination. The injury factor took into consideration any plants not expected to survive. Thus, phytotoxicity ratings were based on the number of plants which emerged and would survive as observed two weeks after planting. Herbicidal ratings were assigned by means of the following conversion scale.

Percent emergence:     Phytotoxicity rating
0–25 _____ 3 or severe.
26–50 _____ 2 or moderate.
51–75 _____ 1 or slight.
76–100 _____ 0 or none.

|  | Dosage, Lbs./Acre | Phytotoxicity Rating to Wild Oats |
|---|---|---|
| Benzyl diisopropylthiolcarbamate | ½ | 3 |
| Benzyl dibutylthiolcarbamate | 1 | 3 |
| Benzyl diisopropylthionocarbamate | 5 | 2 |
| Benzyl dibutylthinoocarbamate | 1 | 2 |
| 2,6-Dichlorobenzyl diisopropylthiolcarbamate | 1 / ½ | 3 / 2 |
| 2,3,6-Trichlorobenzyl diisopropylthiolcarbamate | 1 / ½ | 3 / 2 |
| m-Chlorobenzyl diisopropylthiolcarbamate | 1 / ¼ | 3 / 2 |
| m-Chlorobenzyl diisopropylthionocarbamate | 1 | 0 |
| m-Cholorobenzyl diisopropyldithiocarbamate | 1 | 1 |
| 5-Chloro-2-methoxybenzyl diisopropylthiolcarbamate | 1 / ¼ | 3 / 3 |
| 2-5-Dichlorobenzyl diisopropylthiolcarbamate | | |
| ar, ar, ar-Trichlorobenzyl diethylthiolcarbamate | 2½ | 2 |
| ar, ar, ar-Trichlorobenzyl diethyldithiocarbamate | 2½ | 0 |

The above thiolcarbamates are toxic to nut grass, another pernicious weed.

It is intended to cover all changes and modifications of the examples of the invention herein chosen for purposes of disclosure which do not constitute departures from the spirit and scope of the invention.

This application is a continuation-in-part of application Serial No. 657,051, filed May 6, 1957, now U.S. Patent No. 2,992,091, dated June 11, 1961.

What is claimed is:
1. A compound of the structure

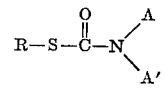

where R represents a radical selected from the group consisting of benzyl, m-chlorobenzyl, 2,5-dichlorobenzyl, 2,6-dichlorobenzyl, 2,3,6-trichlorobenzyl and 5-chloro-2-methoxybenzyl and A and A′ represent alkyl radicals containing two to four carbon atoms inclusive.

2. A compound of the structure

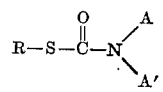

where R represents the benzyl radical and A and A′ represent alkyl radicals of three to four carbon atoms inclusive.

3. 2,3,6-trichlorobenzyl diisopropylthiolcarbamate.
4. Benzyl diisopropylthiolcarbamate.
5. m-Chlorobenzyl diisopropylthiolcarbamate.
6. 5-chloro-2-methoxybenzyl diisopropylthiolcarbamate.
7. 2,5-dichlorobenzyl diisopropylthiolcarbamate.
8. Benzyl dibutylthiolcarbamate.
9. 2,6-dichlorobenzyl diisopropylthiolcarbamate.

References Cited in the file of this patent
UNITED STATES PATENTS

| 2,060,733 | Hunt et al. | Nov. 10, 1936 |
| 2,396,487 | Blake | Mar. 12, 1946 |
| 2,438,599 | Blake | Mar. 30, 1948 |
| 2,941,879 | Goodhue | June 21, 1960 |
| 2,974,082 | Collins | Mar. 7, 1961 |
| 2,983,747 | Campbell et al. | May 9, 1961 |

OTHER REFERENCES

Noller: "Chemistry of Organic Compounds," 2nd ed., page 272 (1957).